United States Patent
Romero et al.

(10) Patent No.: US 12,534,101 B1
(45) Date of Patent: Jan. 27, 2026

(54) SYSTEM AND METHOD FOR ROUTING VEHICLE NOTIFICATIONS

(71) Applicant: FCA US LLC, Auburn Hills, MI (US)

(72) Inventors: Lucas Romero, Auburn Hills, MI (US); Jonah Jacquo, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 10 days.

(21) Appl. No.: 18/785,604

(22) Filed: Jul. 26, 2024

(51) Int. Cl.
*B60W 50/14* (2020.01)
*H04L 67/306* (2022.01)

(52) U.S. Cl.
CPC .......... *B60W 50/14* (2013.01); *H04L 67/306* (2013.01)

(58) Field of Classification Search
CPC .............................. B60W 50/14; H04L 67/306
USPC .......................................................... 340/435
See application file for complete search history.

(56) References Cited

U.S. PATENT DOCUMENTS

| | | | | |
|---|---|---|---|---|
| 8,644,165 B2* | 2/2014 | Saarimaki | ......... | H04M 1/72454 709/224 |
| 8,849,238 B2* | 9/2014 | Cepuran | ............... | H04W 4/023 455/41.3 |
| 9,008,853 B2* | 4/2015 | Petrucci | ................ | B60R 16/037 701/1 |
| 9,615,350 B2* | 4/2017 | Malahy | ............... | H04M 1/6075 |
| 9,786,170 B2* | 10/2017 | Roy | .................. | G08G 1/096775 |
| 10,059,348 B2* | 8/2018 | Malahy | .................... | B60Q 9/00 |
| 10,506,091 B2* | 12/2019 | Tibbitts | ............. | H04M 1/72463 |
| 10,605,615 B2* | 3/2020 | Liebinger | .......... | G01C 21/3691 |
| 11,455,888 B2* | 9/2022 | Ahmad | .................. | G08G 1/162 |
| 2013/0035117 A1* | 2/2013 | Litkouhi | ................. | H04L 67/12 455/456.4 |
| 2015/0373666 A1* | 12/2015 | Malahy | ................. | H04W 68/00 455/414.1 |
| 2017/0072850 A1* | 3/2017 | Curtis | .................... | B60K 35/85 |
| 2017/0203771 A1* | 7/2017 | Malahy | ............... | H04M 1/6075 |
| 2018/0238702 A1* | 8/2018 | Liebinger | .......... | G01C 21/3461 |
| 2018/0321678 A1* | 11/2018 | Valeri | .................. | B60W 10/10 |
| 2024/0372942 A1* | 11/2024 | Maniwa | ............ | B60W 60/0053 |

* cited by examiner

*Primary Examiner* — Eric Blount
(74) *Attorney, Agent, or Firm* — Jeremy J. Klobucar

(57) ABSTRACT

A vehicle notification routing system configured for use with a vehicle is provided that includes a computing device, that performs operations including: receive, at the vehicle notification routing system, a vehicle notification, indicative of a vehicle alert; determine, at the vehicle notification routing system, a selected driver profile of a plurality of driver profiles associated users of the vehicle; determine, at the vehicle notification routing system, a driving status of associated users of the vehicle, the driving status comprising an active driver status and a non-active driver status; determine, at the vehicle notification routing system, a location of mobile devices associated with the associated users of the vehicle; and route, based on the determinations, the vehicle notification to at least one of a human machine interface (HMI) and a mobile device of the mobile devices associated with the users of the vehicle.

16 Claims, 2 Drawing Sheets

SYSTEM AND METHOD FOR ROUTING VEHICLE NOTIFICATIONS

FIELD

The present application relates generally to a vehicle notification routing system that routes notifications to a preferred destination based on operational circumstances.

BACKGROUND

Many vehicles have the ability for sending vehicle notifications to a human machine interface (HMI) in the vehicle and to a device (e.g., mobile device, etc.) associated with the vehicle. As is known, it is preferred to surface such vehicle notifications safely to the individual best suited to consume the information even if that individual is driving the vehicle. Unfortunately, vehicle notifications are routed to specified devices. In this regard, if a device is scheduled to receive a notification, it will receive the notification no matter where the device is located or who is driving the vehicle.

Accordingly, while such conventional vehicle notification systems as suitable for their intended purpose, there is a desire for improvement in the relevant art.

SUMMARY

In accordance with one example aspect of the invention, a vehicle notification routing system configured for use with a vehicle is provided that includes a computing device, including one or more processors, a communication device for communication with a secure server via a network, and a non-transitory computer-readable storage medium having a plurality of instructions stored thereon, which, when executed by the one or more processors, cause the one or more processors to perform operations including: receive, at the vehicle notification routing system, a vehicle notification, indicative of a vehicle alert; determine, at the vehicle notification routing system, a selected driver profile of a plurality of driver profiles associated users of the vehicle; determine, at the vehicle notification routing system, a driving status of associated users of the vehicle, the driving status comprising an active driver status and a non-active driver status; determine, at the vehicle notification routing system, a location of mobile devices associated with the associated users of the vehicle; and route, based on the determinations, the vehicle notification to at least one of a human machine interface (HMI) and a mobile device of the mobile devices associated with the users of the vehicle.

In addition to the foregoing, in one example, the vehicle notification routing system determines that: a first user profile of the plurality of driver profiles is selected; a first user is an active driver status; a mobile device associated with the first user is on-board the vehicle; route the notification exclusively to the HMI.

In addition to the foregoing, in another example, the vehicle notification routing system determines that: a first user profile of the plurality of driver profiles is selected; a first user is an active driver status; a mobile device associated with the first user is outside of the vehicle; route the notification exclusively to the HMI.

In other examples, the vehicle notification routing system determines that: a second user profile of the plurality of driver profiles is selected; a first user is an active driver status; a mobile device associated with the first user is on-board the vehicle; route the notification exclusively to a second mobile device of the second user.

In other examples, the vehicle notification routing system determines that: a first user profile of the plurality of driver profiles is selected; a second user is an active driver status; a first mobile device associated with the first user is on-board the vehicle; a second mobile device associated with the second user is on-board the vehicle; route the notification exclusively to the HMI.

In other examples, the one or more processors further receive the message from a cloud.

In other examples, the cloud is at least one of at an original equipment manufacturer (OEM) cloud and a third party cloud associated for cooperation with the vehicle notification system.

In other examples, the computing device further determines a notification type of the vehicle notification and route the vehicle notification based on the notification type.

In other examples, a method of using a vehicle notification routing system is provided. The vehicle notification system is configured for use with a vehicle and comprising a computing device, including one or more processors, a communication device for communication with a secure server via a network, and a non-transitory computer-readable storage medium having a plurality of instructions stored thereon, which, when executed by the one or more processors, cause the one or more processors to perform operations. The method includes: receiving, at the vehicle notification routing system, a vehicle notification, indicative of a vehicle alert; determining, at the vehicle notification routing system, a selected driver profile of a plurality of driver profiles associated users of the vehicle; determining, at the vehicle notification routing system, a driving status of associated users of the vehicle, the driving status comprising an active driver status and a non-active driver status; determining, at the vehicle notification routing system, a location of mobile devices associated with the associated users of the vehicle; routing, based on the determinations, the vehicle notification to at least one of a human machine interface (HMI) and a mobile device of the mobile devices associated with the users of the vehicle.

In addition to the foregoing, in one example, the vehicle notification routing system determines that: a first user profile of the plurality of driver profiles is selected; a first user is an active driver status; a mobile device associated with the first user is on-board the vehicle; route the notification exclusively to the HMI.

In addition to the foregoing, in another example, the vehicle notification routing system determines that: a first user profile of the plurality of driver profiles is selected; a first user is an active driver status; a mobile device associated with the first user is outside of the vehicle; route the notification exclusively to the HMI.

In other examples, the vehicle notification routing system determines that: a second user profile of the plurality of driver profiles is selected; a first user is an active driver status; a mobile device associated with the first user is on-board the vehicle; route the notification exclusively to a second mobile device of the second user.

In other examples, the vehicle notification routing system determines that: a first user profile of the plurality of driver profiles is selected; a second user is an active driver status; a first mobile device associated with the first user is on-board the vehicle; a second mobile device associated with the second user is on-board the vehicle; route the notification exclusively to the HMI.

In other examples, the one or more processors further receive the message from a cloud.

In other examples, the cloud is at least one of at an original equipment manufacturer (OEM) cloud and a third party cloud associated for cooperation with the vehicle notification system.

In other examples, the method further determines a notification type of the vehicle notification and route the vehicle notification based on the notification type.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, many vehicles have the ability for sending vehicle notifications to a human machine interface (HMI) in the vehicle and to a device (e.g., mobile device, etc.) associated with the vehicle. As is known, it is preferred to surface such vehicle notifications safely to the individual best suited to consume the information even if that individual is driving the vehicle. Unfortunately, vehicle notifications are routed to specified devices. In this regard, if a device is scheduled to receive a notification, it will receive the notification no matter where the device is located or who is driving the vehicle.

Accordingly, the present disclosure provides a vehicle notification routing system that routes relevant notifications to the most preferred or correct destination (e.g., vehicle HMI, preferred mobile device, etc.) determined for optimal consumption of the notification. The vehicle notification routing disclosed herein leverages real-time information about the state of the vehicle, the individual who is driving the vehicle, the proximity of known mobile devices and user preferences to surface relevant and timely notifications to a user. Vehicle routing uses logic in the cloud to determine where a notification relevant to a user should be routed to. For example, if a user is driving the vehicle, the notification that meets predetermined criteria can be routed to their vehicle (such as for example, the vehicle HMI). If a user is a passenger or not driving, they may be alerted on their mobile device. The routing system is fed by vehicle data, such as automatically or manually selected driver profile, vehicle status and vehicle location.

The vehicle notification routing system determines if a user is driving their vehicle. A determination is made whether relevant notification can and should be routed to the vehicle or be delivered silently to their mobile device. Examples include alerts about other vehicles they may own, such as a partner or child who has activated their hazard lights or may have encountered a flat tire. Such alerts are surfaced to the driver in the safest way possible if they are driving leveraging audio and/or visual modalities. This eliminates a user from needing to engage with a mobile device.

Figure 1:
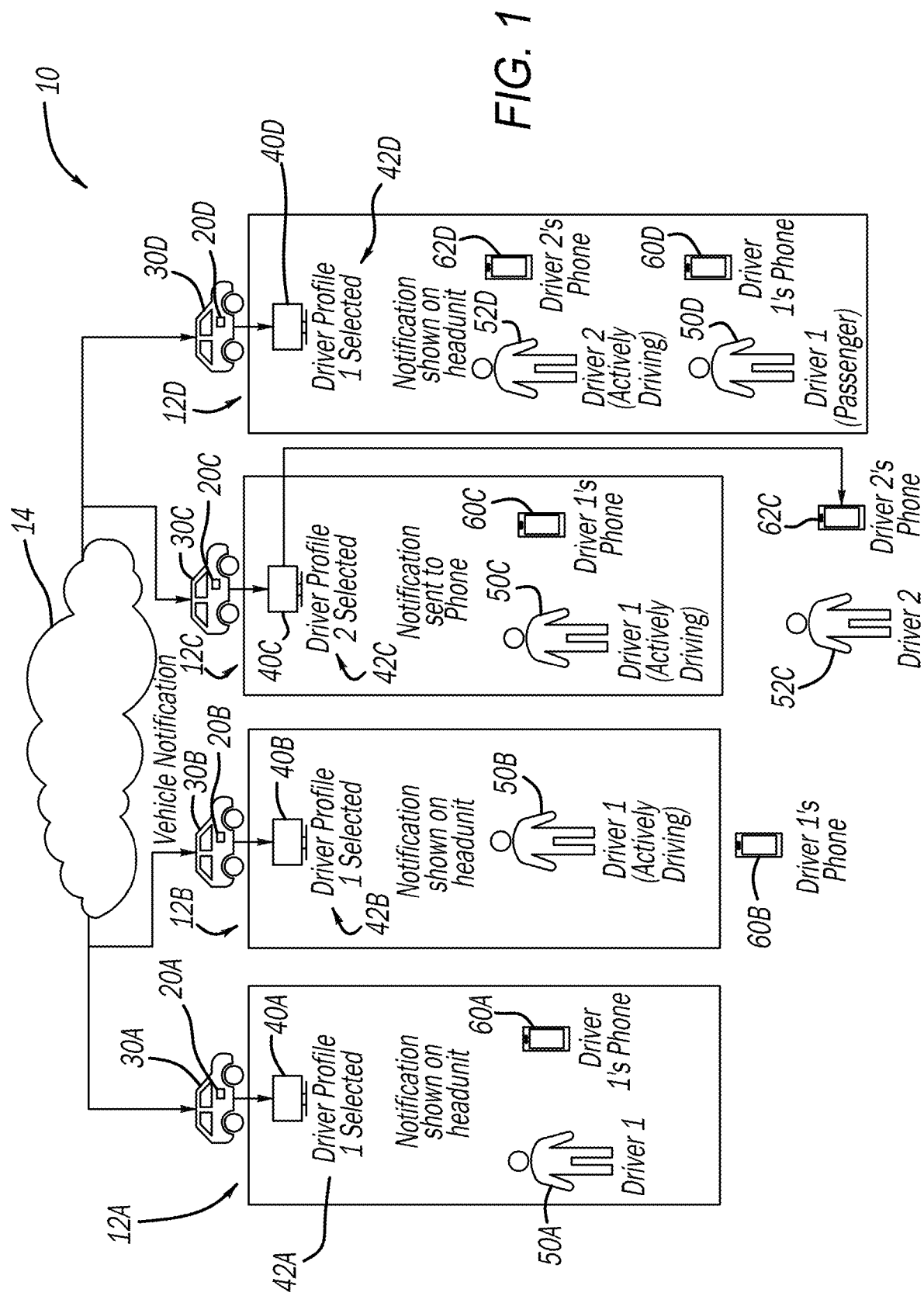
FIG. 1 is a diagram of an example vehicle notification routing system in accordance with the principles of the present application.
Figure 2:
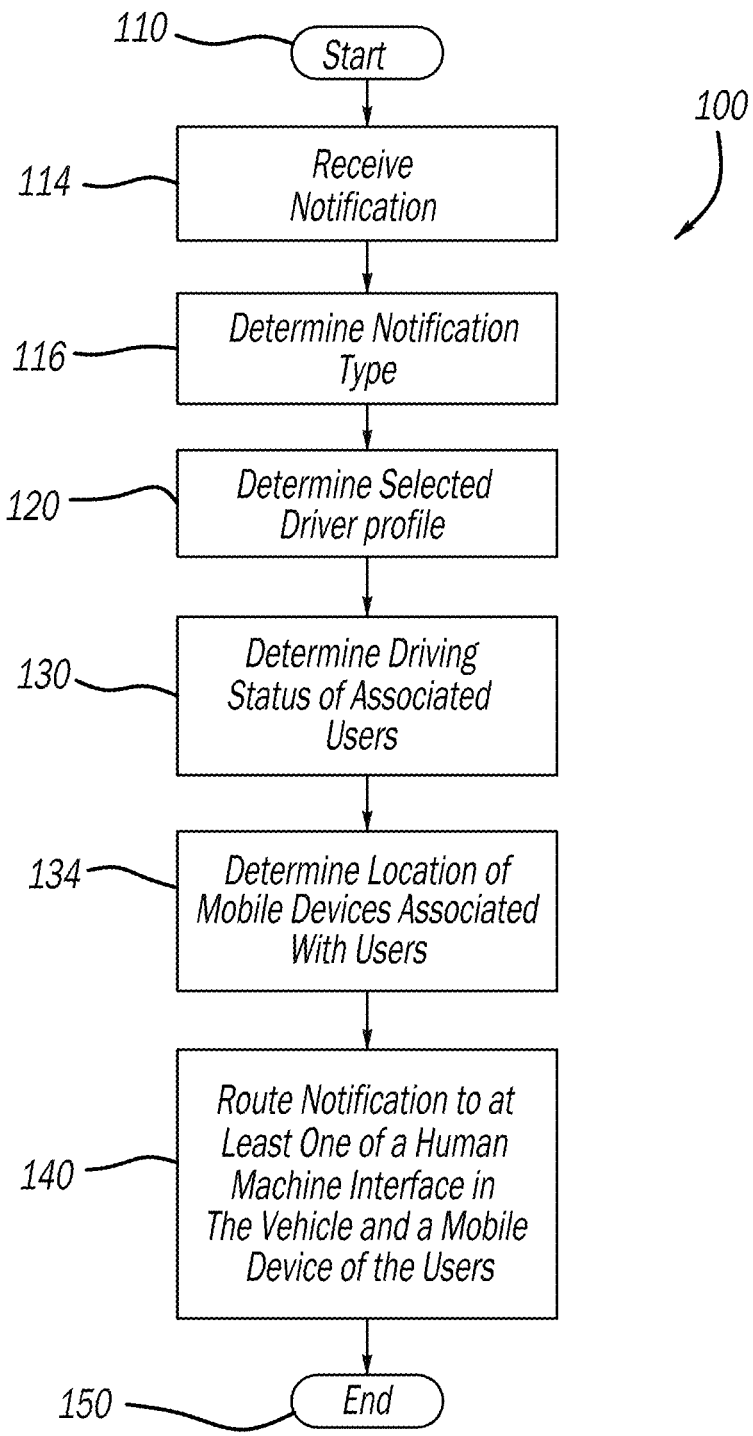
FIG. 2 is a functional block diagram of method of using the example vehicle notification routing system of FIG. 1, in accordance with the principles of the present application.

With reference now to FIG. 1, a diagram of an example vehicle notification routing system 10 is illustrated in accordance with the principles of the present disclosure. As used herein a notification is defined as any alert, message, or other information related to the vehicle. The example vehicle notification routing system 10 is shown operating in four exemplary use cases 12A, 12B, 12C and 12D. Implementation of the example vehicle notification routing system 10 according to the first use case 12A will be described. In general, the vehicle notification routing system 10 receives a notification from a cloud 14. The cloud can be an original equipment manufacturer (OEM) cloud and/or a third part cloud associated for cooperation with the vehicle notification routing system 10. The vehicle notification routing system 10 includes a computing device 20A provided in a vehicle 30A that executes the vehicle notification routing system 10. The computing device 20A can include one or more processors configured to control operation of the computing device 20A. The vehicle 30A includes a headunit or HMI 40A.

The computing device 20A determines a selected driver profile 42A. The driver profile includes a selected profile that associates various presets with a given user. For example a driver profile 1 can include first vehicle settings such as radio presets, seat position presets and other vehicle functions that are assigned to driver profile 1. In this regard, a driver profile 2 can include second vehicle settings such as radio presets, seat position presets and other vehicle functions that are assigned to driver profile 2. Additional driver profiles such as profile 3, profile 4, etc., can also be established and available for selection by the computing device 20A. In the first use case 12A, the driver profile 1 is selected. The computing device 20A can determine a driving status of an associated user. In the first use case 12A, the computing device 20A determines that driver 1 50A is driving the vehicle 30A. The computing device 20A further determines a location of driver 1's 50A mobile device 60A. In the first use case 12A, the computing device 20A determines that the mobile device 60A is located inside the vehicle 30A. The computing device 20A routes the notification to the vehicle HMI 40A and not to the mobile device 60A.

Implementation of the example vehicle notification routing system 10 according to the second use case 12B will be described. In general, the vehicle notification routing system 10 receives a notification from a cloud 14. The vehicle notification routing system 10 includes a computing device 20B provided in a vehicle 30B that executes the vehicle notification routing system 10. The computing device 20B can include one or more processors configured to control operation of the computing device 20B. The vehicle 30B includes a headunit or HMI 40B.

The computing device 20B determines a selected driver profile 42B. In the second use case 12B, the driver profile 1 is selected. The computing device 20B can determine a driving status of an associated user. In the second use case 12B, the computing device 20B determines that driver 1 50B is actively driving the vehicle 30B. The computing device 20B further determines a location of driver 1's 50B mobile device 60B. In the second use case 12B, the computing device 20B determines that the mobile device 60B is located outside the vehicle 30B. In the second use case 12B, the computing device 20B routes the notification to the vehicle HMI 40B and not to the mobile device 60B.

Implementation of the example vehicle notification routing system 10 according to the third use case 12C will be described. In general, the vehicle notification routing system 10 receives a notification from a cloud 14. The vehicle notification routing system 10 includes a computing device 20C provided in a vehicle 30C that executes the vehicle notification routing system 10. The computing device 20C can include one or more processors configured to control operation of the computing device 20C. The vehicle 30C includes a headunit or HMI 40C.

The computing device 20C determines a selected driver profile 42C. In the third use case 12C, the driver profile 2 is selected. The computing device 20C can determine a driving status of an associated user. In the third use case 12C, the computing device 20C determines that driver 1 50C is actively driving the vehicle 30C. The computing device 20C further determines a location of driver 1's, 50C mobile device 60C and driver 2's, 52C mobile device 62C. In the third use case 12C, the computing device 20C determines that the mobile device 60C is located inside the vehicle 30C and the mobile device 62C is located outside the vehicle 30C. In the third use case 12C, the computing device 20C routes the notification to the mobile device 62C associated with the selected driver profile 42C (e.g., driver 2, 52C).

Implementation of the example vehicle notification routing system 10 according to the fourth use case 12D will be described. In general, the vehicle notification routing system 10 receives a notification from a cloud 14. In examples, the cloud 14 can communicate signals to the associated vehicle such as by cellular networks, satellites or other wireless paths. The vehicle notification routing system 10 includes a computing device 20D provided in a vehicle 30D that executes the vehicle notification routing system 10. The computing device 20D can include one or more processors configured to control operation of the computing device 20D. The vehicle 30D includes a headunit or HMI 40D.

The computing device 20D determines a selected driver profile 42D. In the fourth use case 12D, the driver profile 1 is selected. The computing device 20D can determine a driving status of an associated user. In the fourth use case 12D, the computing device 20D determines that driver 2 52D is actively driving the vehicle 30D. The computing device 20D further determines a location of driver 1's, 50D mobile device 60D and driver 2's, 52D mobile device 62D. In the fourth use case 12D, the computing device 20D determines that the mobile device 60D is located inside the vehicle 30D and the mobile device 62D is located inside the vehicle 30D. In the fourth use case 12D, the computing device 20D routes the notification to the HMI 40D.

In the example embodiments, the computing device 20 includes one or more processors, a communication device for communication with a secure server via a network, and a non-transitory computer-readable storage medium having a plurality of instructions stored thereon, which, when executed by the one or more processors, cause the one or more processors to perform operations the computing devices 20 all have processors and memory. The processors are configured to control operation of the computing devices 20. The term "processor" as used herein can refer to both a single processor and two or more processors operating in a parallel or distributed architecture. The memory can be any suitable storage medium (flash, hard disk, etc.) configured to store information at the computing device 20. In one implementation, the memory is a non-transitory computer-readable storage medium configured to store instructions executable by the processors to cause the computing device 20 to perform at least a portion of the disclosed techniques.

An example method 100 for using the vehicle notification routing system 10 will be described. The method begins at step 110. At step 114, the computing device 20 receives a notification from the cloud 14. Control determines the notification type at 116. The notification type can be any type such as, but not limited to, an alert, a push notification, and an emergency signal. At 120 control determines which driver profile has been selected. At 130, control determines a driving status of the associated users. The driving status can include an active driver status, a passenger status or a non-passenger status. At 134, control determines a location of mobile devices associated with the users. At 140 control routes the notification to at least one of an HMI in the vehicle and a mobile device of the users. The method ends at 150.

The methods and systems described herein with respect to the vehicle notification routing system 10 may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other types of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware.

The software program may be associated with a server that may include a file server, print server, domain server, Internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server. In embodiments, the server may be a virtual machine that is executed by a processing system of a cloud-services platform (e.g., Amazon® AWS). In these embodiments, the cloud-services platform may offer computing resources that host and support various aspects of a third-party's software systems.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, and instructions described herein and elsewhere may be executed by one or more of the network infrastructural elements. The methods and systems described herein may be adapted for use with any kind of private, community, or hybrid cloud computing network or cloud computing environment, including those that involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle notification routing system configured for use with a vehicle, the vehicle notification routing system comprising:
a computing device, including one or more processors, a communication device for communication with a secure server via a network, and a non-transitory computer-readable storage medium having a plurality of instructions stored thereon, which, when executed by the one or more processors, cause the one or more processors to perform operations including:
receive, at the vehicle notification routing system, a vehicle notification, indicative of a vehicle alert;
determine, at the vehicle notification routing system, a selected driver profile of a plurality of driver profiles associated users of the vehicle;
determine, at the vehicle notification routing system, a driving status of associated users of the vehicle, the driving status comprising an active driver status and a non-active driver status;
determine, at the vehicle notification routing system, a location of mobile devices associated with the associated users of the vehicle; and
route, based on the determinations, the vehicle notification to at least one of a human machine interface (HMI) and a mobile device of the mobile devices associated with the users of the vehicle.

2. The vehicle notification routing system of claim 1, wherein the vehicle notification routing system determines that: a first user profile of the plurality of driver profiles is selected; a first user is an active driver status; a mobile device associated with the first user is on-board the vehicle; route the notification exclusively to the HMI.

3. The vehicle notification routing system of claim 1, wherein the vehicle notification routing system determines that: a first user profile of the plurality of driver profiles is selected; a first user is an active driver status; a mobile device associated with the first user is outside of the vehicle; route the notification exclusively to the HMI.

4. The vehicle notification routing system of claim 1, wherein the vehicle notification routing system determines that: a second user profile of the plurality of driver profiles is selected; a first user is an active driver status; a mobile device associated with the first user is on-board the vehicle; route the notification exclusively to a second mobile device of the second user.

5. The vehicle notification routing system of claim 1, wherein the vehicle notification routing system determines that: a first user profile of the plurality of driver profiles is selected; a second user is an active driver status; a first mobile device associated with the first user is on-board the vehicle; a second mobile device associated with the second user is on-board the vehicle; route the notification exclusively to the HMI.

6. The vehicle notification routing system of claim 1, wherein the one or more processors further:
receive the message from a cloud.

7. The vehicle notification routing system of claim 6, wherein the cloud is at least one of at an original equipment manufacturer (OEM) cloud and a third party cloud associated for cooperation with the vehicle notification system.

8. The vehicle notification routing system of claim 1, wherein the computing device further determines a notification type of the vehicle notification and route the vehicle notification based on the notification type.

9. A method of using a vehicle notification routing system configured for use with a vehicle and comprising a computing device, including one or more processors, a communication device for communication with a secure server via a network, and a non-transitory computer-readable storage medium having a plurality of instructions stored thereon, which, when executed by the one or more processors, cause the one or more processors to perform operations, the method comprising:
receiving, at the vehicle notification routing system, a vehicle notification, indicative of a vehicle alert;
determining, at the vehicle notification routing system, a selected driver profile of a plurality of driver profiles associated users of the vehicle;
determining, at the vehicle notification routing system, a driving status of associated users of the vehicle, the driving status comprising an active driver status and a non-active driver status;
determining, at the vehicle notification routing system, a location of mobile devices associated with the associated users of the vehicle; and
routing, based on the determinations, the vehicle notification to at least one of a human machine interface (HMI) and a mobile device of the mobile devices associated with the users of the vehicle.

10. The method of claim 9, wherein the vehicle notification routing system determines that: a first user profile of the plurality of driver profiles is selected; a first user is an active driver status; a mobile device associated with the first user is on-board the vehicle; route the notification exclusively to the HMI.

11. The method of claim 9, wherein the vehicle notification routing system determines that: a first user profile of the plurality of driver profiles is selected; a first user is an active driver status; a mobile device associated with the first user is outside of the vehicle; route the notification exclusively to the HMI.

12. The method of claim 9, wherein the vehicle notification routing system determines that: a second user profile of the plurality of driver profiles is selected; a first user is an active driver status; a mobile device associated with the first user is on-board the vehicle; route the notification exclusively to a second mobile device of the second user.

13. The method of claim 9, wherein the vehicle notification routing system determines that: a first user profile of the plurality of driver profiles is selected; a second user is an active driver status; a first mobile device associated with the first user is on-board the vehicle; a second mobile device associated with the second user is on-board the vehicle; route the notification exclusively to the HMI.

14. The method of claim 9, wherein the one or more processors further:
receive the message from a cloud.

15. The method of claim 14, wherein the cloud is at least one of at an original equipment manufacturer (OEM) cloud and a third party cloud associated for cooperation with the vehicle notification system.

16. The method of claim 9, wherein the computing device further determines a notification type of the vehicle notification and route the vehicle notification based on the notification type.

* * * * *